(12) United States Patent
Bitto et al.

(10) Patent No.: US 8,104,360 B2
(45) Date of Patent: Jan. 31, 2012

(54) VIBRATION-TYPE MEASURING TRANSDUCER HAVING SECUREMENT ELEMENT FOR MOUNTING COMPONENTS OF THE OSCILLATION SENSOR

(75) Inventors: Ennio Bitto, Aesch (CH); Christian Schütze, Basel (CH); Martin Anklin, Dornach (CH); Vivek Kumar, Muttenz (CH)

(73) Assignee: Endress + Hauser Flowtec AG, Reinach (CH)

( * ) Notice: Subject to any disclaimer, the term of this patent is extended or adjusted under 35 U.S.C. 154(b) by 213 days.

(21) Appl. No.: 12/458,949

(22) Filed: Jul. 28, 2009

(65) Prior Publication Data
US 2010/0031755 A1      Feb. 11, 2010

Related U.S. Application Data

(60) Provisional application No. 61/136,197, filed on Aug. 18, 2008.

(30) Foreign Application Priority Data

Aug. 1, 2008   (DE) .......................... 10 2008 035877

(51) Int. Cl.
G01F 1/84 (2006.01)
(52) U.S. Cl. ................................. 73/861.357
(58) Field of Classification Search .......... None
See application file for complete search history.

(56) References Cited

U.S. PATENT DOCUMENTS

| | | | |
|---|---|---|---|
| 4,756,198 A | 7/1988 | Levien | |
| 4,811,606 A * | 3/1989 | Hasegawa et al. | 73/861.357 |
| 4,895,031 A | 1/1990 | Cage | |
| 5,048,350 A * | 9/1991 | Hussain et al. | 73/861.355 |
| 5,349,872 A | 9/1994 | Kalotay | |
| 5,987,998 A * | 11/1999 | Campbell et al. | 73/861.356 |
| 6,047,457 A * | 4/2000 | Bitto et al. | 29/516 |
| 6,223,605 B1 * | 5/2001 | Koudal et al. | 73/861.357 |
| 6,487,917 B1 * | 12/2002 | Van Cleve et al. | 73/861.357 |
| 6,598,489 B1 * | 7/2003 | Van Cleve et al. | 73/861.357 |
| 2005/0155437 A1 * | 7/2005 | Bitto et al. | 73/861.355 |
| 2007/0000334 A1 * | 1/2007 | Bitto et al. | 73/861.356 |
| 2007/0095152 A1 * | 5/2007 | Bitto et al. | 73/861.355 |
| 2009/0084195 A1 * | 4/2009 | Nakao | 73/861.357 |

FOREIGN PATENT DOCUMENTS

| | | |
|---|---|---|
| DE | 36 50 535 T2 | 2/1997 |
| DE | 103 12 796 | 9/2004 |
| DE | 10 2004 030 392 | 1/2006 |
| DE | 10 2005 003 161 B4 | 3/2007 |

(Continued)

Primary Examiner — Harshad Patel
(74) Attorney, Agent, or Firm — Bacon & Thomas, PLLC (57) ABSTRACT

A measuring transducer comprises a measuring tube vibrating at least at times during operation, having a wall thickness (s) and at least one oscillation sensor, especially an electrodynamic oscillation sensor, for producing at least one primary signal of the measuring transducer representing vibrations of the measuring tube. In the measuring transducer at least one securement element, especially a metal securement element, fixedly encircling the measuring tube essentially along a circumferential line thereof and having a total width (B), for holding a component of the oscillation sensor, especially a magnet coil or a permanent magnet, on the measuring tube is provided. The securement element has an essentially rectangular outer perimeter with a projection protruding out therefrom by a height (h) and serving for holding the component of the oscillation sensor. The projection has a width (e), which is smaller than the total width (B) of the securement element.

34 Claims, 4 Drawing Sheets

FOREIGN PATENT DOCUMENTS

| | | |
|---|---|---|
| DE | 10 2005 060 495 B3 | 4/2007 |
| DE | 10 2008 007 742 A1 | 11/2008 |
| EP | 0 759 542 | 2/1997 |
| EP | 1 985 975 A2 | 10/2008 |
| WO | WO 2006/014153 A1 | 2/2006 |
| WO | WO 2006/037722 A1 | 4/2006 |

* cited by examiner

VIBRATION-TYPE MEASURING TRANSDUCER HAVING SECUREMENT ELEMENT FOR MOUNTING COMPONENTS OF THE OSCILLATION SENSOR

CROSS-REFERENCE TO RELATED APPLICATION

This application is a Nonprovisional which claims the benefit of U.S. Provisional Application No. 61/136,197 filed on Aug. 18, 2008.

FIELD OF THE INVENTION

The invention relates to a measuring transducer of a vibration-type, including: at least one measuring tube vibrating at least at times during operation for conveying medium to be measured, especially medium in the form of a gas and/or a liquid; at least one oscillation sensor for producing at least one primary signal of the measuring transducer representing vibrations of the measuring tube; as well as at least one securement element fixedly encircling the measuring tube essentially along a circumferential line thereof for holding a component of the oscillation sensor, for instance a magnet coil or a permanent magnet, on the measuring tube.

BACKGROUND DISCUSSION

In industrial measurements technology, especially also in connection with the control and monitoring of automated manufacturing processes, for ascertaining the characteristic measured variables of a media, for example, liquids and/or gases, flowing in a process line, for example, a pipeline, measuring systems are often used; which induce, by means of a measuring transducer of the vibration-type and a driver, and evaluating, electronics connected thereto and most often accommodated in a separate electronics housing, reaction forces, for example, Coriolis forces, in the flowing medium. Derived from these reaction forces, a measurement signal correspondingly representing the at least one measured variable, for example, a mass flow, a density, a viscosity or another process parameter is produced.

Measuring systems of this kind, which are often formed by means of an inline measuring device in compact construction with an integrated measuring transducer, such as, for instance, a Coriolis mass flow meter, have been known for a long time and have proven themselves in industrial use. Examples of such measuring systems having a measuring transducer of the vibration-type, or also individual components thereof, are described e.g. in EP-A 317 340, U.S. Pat. No. 4,738,144, U.S. Pat. No. 4,777,833, U.S. Pat. No. 4,823,614, U.S. Pat. No. 5,287,754, U.S. Pat. No. 5,291,792, U.S. Pat. No. 5,301,557, U.S. Pat. No. 5,398,554, U.S. Pat. No. 5,476,013, U.S. Pat. No. 5,531,126, U.S. Pat. No. 5,602,345, U.S. Pat. No. 5,610,342, U.S. Pat. No. 5,731,527, U.S. Pat. No. 5,691,485, U.S. Pat. No. 5,796,010, U.S. Pat. No. 5,796,012, U.S. Pat. No. 5,796,011, U.S. Pat. No. 5,945,609, U.S. Pat. No. 5,979,246, U.S. Pat. No. 6,047,457, U.S. Pat. No. 6,092,429, U.S. Pat. No. 6,168,069, U.S. Pat. No. 6,223,605, U.S. Pat. No. 6,311,136, U.S. Pat. No. 6,330,832, U.S. Pat. No. 6,397,685, U.S. Pat. No. 6,557,422, U.S. Pat. No. 6,519,828, U.S. Pat. No. 6,666,098, U.S. Pat. No. 6,378,364, U.S. Pat. No. 6,691,583, U.S. Pat. No. 6,840,109, U.S. Pat. No. 6,860,158, U.S. Pat. No. 6,883,387, U.S. Pat. No. 6,651,513, U.S. Pat. No. 6,758,102, U.S. Pat. No. 6,920,798, U.S. Pat. No. 7,080,564, U.S. Pat. No. 7,073,396, U.S. Pat. No. 7,077,014, U.S. Pat. No. 7,040,179, U.S. Pat. No. 7,017,424, U.S. Pat. No. 7,213,469, U.S. Pat. No. 7,299,699, U.S. Pat. No. 7,337,676, U.S. Pat. No. 7,340,964, U.S. Pat. No. 7,360,451, U.S. Pat. No. 7,392,709, US-A 2006/0201260, US-A 2007/0186685, US-A 2007/0151371, US-A 2007/0151370, US-A 2007/0119265, US-A 2007/0119264, US-A 2008/0141789, US-A 2008/0047361, the JP-A 8-136311, the JP-A 9-015015, WO-A 08/059015, WO-A 08/013545, WO-A 01 02 816, WO-A 00 14 485 or WO-A 99 40 394. Each of the therein illustrated, measuring transducers comprises at least one, essentially straight, or at least one, curved, measuring tube for conveying the medium, which can, in given cases, also be extremely cold or extremely hot.

In the operation of the measuring system, the at least one measuring tube is caused to vibrate during operation for the purpose of generating oscillation forms influenced also by the medium flowing through the measuring tube.

For exciting oscillations of the at least one measuring tube, measuring transducers of the vibration-type include, additionally, an exciter mechanism driven during operation by an electrical driver signal e.g. in the form of a controlled electrical current, generated and correspondingly conditioned by the mentioned driver electronics. The exciter mechanism excites the measuring tube during operation by means of at least one electromechanical, especially electrodynamic, oscillation exciter, through which an electrical current flows and which acts essentially directly on the measuring tube, such that the measuring tube executes bending oscillations in the wanted mode. Furthermore, such a measuring transducer includes a sensor arrangement having oscillation sensors, especially electrodynamic oscillation sensors, for at least pointwise registering of inlet side and outlet side oscillations of the at least one measuring tube, especially those in the Coriolis mode, and for producing electrical sensor signals influenced by the process parameter to be registered, such as, for instance, the mass flow or the density.

Selected as excited oscillation form, the so-called wanted mode, in the case of measuring transducers with a curved measuring tube, e.g. U, V or Ω shaped, is usually that of an eigenoscillation form, in the case of which the measuring tube moves like a pendulum at least partially in a lowest natural resonance frequency about an imaginary longitudinal axis of the measuring transducer in the manner of a cantilever clamped at one end, whereby Coriolis forces are induced in the medium flowing through the measuring tube as a function of the mass flow. This, in turn, leads to the fact that, superimposed on the excited oscillations of the wanted mode, in the case of curved measuring tubes, thus, pendulum-like, cantilever oscillations, are bending oscillations of equal frequency according to at least one, likewise natural, second oscillation form, the so-called Coriolis mode. In the case of measuring transducers with curved measuring tubes, these cantilever oscillations in the Coriolis mode brought about by Coriolis forces correspond usually to the eigenoscillation form, in which the measuring tube also executes rotary oscillations about an axis perpendicular to the longitudinal axis. In the case of measuring transducers with straight measuring tubes, in contrast, for the purpose of producing Coriolis forces dependent on mass flow, often such a wanted mode is selected, wherein the measuring tube executes, at least partially, bending oscillations essentially in a single plane of oscillation, so that the oscillations in the Coriolis mode are formed accordingly as bending oscillations of equal oscillation frequency coplanar with the oscillations of the wanted mode.

Due to the superpositioning of the wanted mode and Coriolis mode, the oscillations of the vibrating measuring tube registered by means of the sensor arrangement on the inlet side and on the outlet side have a measurable phase difference also dependent on mass flow. Usually, the measuring tubes of such measuring transducers applied e.g. in Coriolis mass flow meters are excited during operation to an instantaneous, natural, resonance frequency of the oscillation form selected for the wanted mode, especially an oscillation form having an oscillation amplitude controlled to be constant. Since this resonance frequency depends, especially, also on the instantaneous density of the medium, usually marketed Coriolis mass flow meters can measure, besides the mass flow, supplementally also the density of flowing media. Additionally, it is also possible, such as, for example, shown in U.S. Pat. No. 6,651,513 or U.S. Pat. No. 7,080,564, directly to measure by means of measuring transducers of the vibration-type also the viscosity of the medium flowing through the measuring tube, for example, based on an excitation power required for exciting the oscillations.

In the case of measuring transducers having two measuring tubes, these are most often integrated into the process line via a distributor piece extending on the inlet side between the measuring tubes and an inlet side, connecting flange, as well as via a distributor piece extending on the outlet side between the measuring tubes and an outlet side connecting flange. In the case of measuring transducers with a single measuring tube, such communicates with the process line most often via an essentially straight, connecting tube piece on the inlet side as well as via an essentially straight, connecting tube piece on the outlet side. Additionally, each of the disclosed measuring transducers having a single measuring tube includes at least one counteroscillator embodied as one piece or constructed from a plurality of parts, for example, a tube-, box- or plate-shaped counteroscillator, which is coupled to the measuring tube on the inlet side to form a first coupling zone and on the outlet side to form a second coupling zone, and which, during operation, essentially either rests or else oscillates opposite-equally to the measuring tube, thus with equal frequency and opposite phase. The inner part of the measuring transducer formed by means of measuring tube and counteroscillator is most often held only by means of the two connecting tube pieces, via which the measuring tube communicates with the process line during operation, in a protective measuring transducer housing, especially in a manner enabling oscillations of the inner part relative to the measuring tube. In the case of the measuring transducers, illustrated, for example, in U.S. Pat. No. 5,291,792, U.S. Pat. No. 5,796,010, U.S. Pat. No. 5,945, 609, U.S. Pat. No. 7,077,014, US-A 2007/0119264, WO-A 01/02 816 or also WO-A 99/40 394, having a single, essentially straight, measuring tube, the latter and the counteroscillator are, such as in the case of conventional measuring transducers quite usual, oriented essentially coaxially relative to one another. In the case of the usually marketed measuring transducers of the aforementioned type, most often, counteroscillator is also embodied essentially tubularly in the form of an essentially straight, hollow cylinder, which is so arranged in the measuring transducer, that the measuring tube is jacketed, at least partially, by the counteroscillator. Used as materials for such counteroscillators, especially also in the case of the application of titanium, tantalum or zirconium for the measuring tube, are, most often, comparatively cost-effective steel types, such as, for instance, structural steel or free-machining steel.

The exciter mechanism of measuring transducers of the type being discussed includes, usually, at least one electrodynamic oscillation exciter and/or an oscillation exciter, which acts differentially on the at least one measuring tube and the, in given cases, present counteroscillator or the, in given cases, present, other measuring tube, while the sensor arrangement includes an inlet side, most often likewise electrodynamic, oscillation sensor as well as at least one, essentially equally-constructed, outlet side oscillation sensor. Such electrodynamic and/or differential oscillation exciters of usually marketed measuring transducers of vibration-type are formed by means of a magnet coil, through which an electrical current flows, at least at times, and which, in the case of measuring transducers having a measuring tube and a counteroscillator coupled thereto, is most often affixed to the latter, as well as by means of a permanent magnet interacting with the at least one magnet coil, especially a permanent magnet plunging into the coil and serving as an armature of rather elongated, especially rod, shape, affixed correspondingly to the measuring tube to be moved. The permanent magnet and the magnet coil serving as an exciter coil are, in such case, usually so oriented, that they extend essentially coaxially relative to one another. Additionally, in the case of conventional measuring transducers, the exciter mechanism is usually embodied and placed in the measuring transducer in such a manner, that it acts essentially centrally on the at least one measuring tube. In such case, the oscillation exciter and, insofar, the exciter mechanism, is, such as, for example, also shown in the case of the measuring transducers disclosed in U.S. Pat. No. 5,796, 010, U.S. Pat. No. 6,840,109, U.S. Pat. No. 7,077,014 or U.S. Pat. No. 7,017,424, most often affixed to the measuring tube at least pointwise along an imaginary central, circumferential line on the outside of the measuring tube. Alternatively to an exciter mechanism formed by means of oscillation exciters acting rather centrally and directly on the measuring tube, it is also possible to use, such as disclosed in, among others, U.S. Pat. No. 6,557,422, U.S. Pat. No. 6,092,429 or U.S. Pat. No. 4,823,614, for example, also exciter mechanisms formed by means of two oscillation exciters affixed to the measuring tube not in the center of the measuring tube, but, instead rather at the inlet and outlet sides thereof or, such as disclosed in, among others, U.S. Pat. No. 6,223,605 or U.S. Pat. No. 5,531, 126, for example, also by means of an oscillation exciter acting between the, in given cases, present counteroscillator and the measuring transducer housing.

In the case of most, usually marketed, measuring transducers of the vibration-type, the oscillation sensors of the sensor arrangement are, as already indicated, at least essentially of construction equal to that of the at least one oscillation exciter, since they work according to the same principle of action. Accordingly, also the oscillation sensors of such a sensor arrangement are, most often, formed, in each case, by means of at least one magnet coil, which is usually affixed to the, in given cases, present counteroscillator, at least at times passed through by a variable magnetic field and, associated therewith, at least at times supplied with an induced measurement voltage, as well as by means of a rod-shaped permanent magnet affixed to the measuring tube, interacting with the at least one magnet coil and delivering the magnetic field. Each of the aforementioned coils is additionally connected by means of at least one pair of electrical connecting lines with the mentioned operating and evaluating electronics of the inline measuring device. These electrical connecting lines are led, most often, on shortest possible paths from the coils via the counteroscillator to the transducer housing.

In the case of measuring transducers of the type being discussed, as mentioned, in among others, also in U.S. Pat. No. 6,047,457 or U.S. Pat. No. 6,920,798, it is additionally usual to secure magnet coil and the therewith corresponding permanent magnets of the oscillation exciter or the oscillation sensors to ring- or washer-shaped, especially metal, securement elements mounted on the measuring tube and fixedly encircling the measuring tube, in each case, essentially along one of its imaginary, circumferential lines. The particular securement element can, as disclosed in among others, U.S. Pat. No. 6,047,457, U.S. Pat. No. 7,299,699, US-A 2006/0201260, U.S. Pat. No. 5,610,342, or U.S. Pat. No. 6,519,828, be affixed by pressing from the outside, by hydraulic pressing or rolling from within the measuring tube or by thermal shrink-fitting to the measuring tube, especially in such a manner, that it is lastingly subjected to elastic or mixed plastic-elastic deformations and, as a result of this, is permanently radially prestressed against the measuring tube.

As discussed in, among others, the initially cited US-A 2008/0141789, U.S. Pat. No. 7,318,356, U.S. Pat. No. 6,920,798, U.S. Pat. No. 6,868,740, U.S. Pat. No. 6,758,102, U.S. Pat. No. 5,734,112, U.S. Pat. No. 5,731,527, U.S. Pat. No. 5,576,500 or U.S. Pat. No. 5,301,557, measuring transducers of the vibration-type and, insofar, the entire measuring system formed therewith, can have, besides the initially mentioned sensitivity to the primary measured variables, mass flow or density and, in given cases, also viscosity, also a certain cross-sensitivity to pressure, this being, especially, the case, when the medium has two or more phases, for instance as a liquid gas mixture. This pressure sensitivity can possibly lead to a, though slight, nevertheless, because of the desired high accuracy of measurement, not, without more, disregardable corruption of the primary measured value, such as, for instance, the mass flow, or can lead to measures being required for correspondingly compensating the measuring errors.

An opportunity for counteracting the undesired cross-sensitivity of such measuring transducers to pressure can, such as proposed e.g. in U.S. Pat. No. 6,920,798, involve use of metal rings or similar metal bodies, which coaxially encompass the measuring tube in regions especially critical for pressure sensitivity, such as, for instance, possibly present transitions between straight and curved tube segments. As additionally brought out in U.S. Pat. No. 6,920,798, such a metal body can simultaneously also serve as a securement element of the aforementioned type.

Further investigations on such measuring systems have, however, shown, that, besides the regions of measuring transducers of the type being discussed already identified as especially critical for pressure sensitivity, still other disturbance sources provoking pressure dependencies within such measuring transducers are to be cared for, which necessitate other measures in such measuring transducers for reducing undesired cross-sensitivity to pressure. Especially, in such case, it has been determined, that fast changes of pressure in the flowing medium, such as, for instance, pressure surges caused by valves and/or pulsating pressure fluctuations caused by pumps, can have considerable influence on the required extremely high accuracy of measurement of measuring systems of the type being discussed. Identified as especially critical have been, furthermore, stroke movements of the oscillation sensors associated with pressure surges in the measuring tube, which can occur with, for the accuracy of measurement, not disregardable amplitudes in the radial direction of the measuring tube, especially, also, in spite of application of the ring- or washer-shaped metal bodies of U.S. Pat. No. 6,047,457 as securement elements.

SUMMARY

An object of the invention, therefore, is to improve measuring systems formed by means of measuring transducers of a vibration-type toward the goal that these exhibit no or only small cross-sensitivity to pressure and, especially, also, allow no or only very small stroke movements in the oscillation sensors.

For achieving the object, the invention resides in a measuring transducer of a vibration-type, including:
 at least one measuring tube vibrating at least at times during operation, especially an at least sectionally curved measuring tube, wherein the measuring tube has a wall thickness;
 at least one oscillation sensor, especially an electrodynamic oscillation sensor, for producing at least one primary signal of the measuring transducer representing vibrations of the measuring tube; as well as
 at least a first securement element fixedly encircling the measuring tube essentially along a circumferential line thereof, especially a metal first securement element, having a total width and serving for holding a component of the oscillation sensor, especially a magnet coil or a permanent magnet, on the measuring tube, wherein the first securement element has an essentially rectangular outer perimeter and a projection protruding therefrom by a height and serving for holding the component of the oscillation sensor, and wherein the projection has a width, which is smaller than the total width of the securement element.

In a first embodiment of the invention, the height of the projection is at least equal to the wall thickness of the measuring tube, especially greater than the wall thickness of the measuring tube.

In a second embodiment of the invention, the width of the projection is at least equal to the wall thickness of the measuring tube, especially greater than the wall thickness of the measuring tube.

In a third embodiment of the invention, it is provided, that the width of the projection is at least twice the wall thickness of the measuring tube, especially more than triple the wall thickness of the measuring tube.

In a fourth embodiment of the invention, it is provided, that the width of the projection is less than 60% of the total width of the securement element.

In a fifth embodiment of the invention, the width of the projection is greater than its height.

In a sixth embodiment of the invention, it is provided, that the projection is arranged, especially centrally, on a side defining the total width of the securement element.

In a seventh embodiment of the invention, a side defining a height of the securement element and lying essentially perpendicular to a side defining the total width of the securement element is greater than the total width of the securement element.

In an eighth embodiment of the invention, the total width of the securement element is greater than 6-times the wall thickness of the measuring tube.

In a ninth embodiment of the invention, the total width of the securement element is greater than a greatest outer diameter of the measuring tube.

In a tenth embodiment of the invention, the securement element, especially as a result of thermal shrink-fitting and/or pressing from the outside and/or hydraulic pressing from within the measuring tube and/or rolling from within the measuring tube, is subjected lastingly to deformations, especially elastic or mixed plastic-elastic deformations.

In an eleventh embodiment of the invention, it is provided, that the securement element is permanently prestressed, especially radially with respect to the measuring tube.

In a twelfth embodiment of the invention, it is provided, that the securement element is connected with the measuring tube at least pointwise, especially sectionally or over the complete circumference, by force interlocking and/or shape interlocking.

In a thirteenth embodiment of the invention, it is provided, that the securement element is bonded to the measuring tube at least pointwise, especially sectionally or over the complete circumference.

In a fourteenth embodiment of the invention, it is provided, that the securement element is soldered, especially hard soldered, or brazed, to the measuring tube at least pointwise, especially sectionally or over the complete circumference.

In a fifteenth embodiment of the invention, it is provided, that the securement element is welded to the measuring tube at least pointwise, especially sectionally or over the complete circumference.

In a sixteenth embodiment of the invention, it is provided, that the securement element is adhered to the measuring tube at least pointwise, especially sectionally or over the complete circumference.

In a seventeenth embodiment of the invention, the securement element is so dimensioned, that temporary elastic deformations of the same, especially elastic deformations effecting deformations of its outer perimeter directed at least partially radially with respect to the measuring tube, especially elastic deformations resulting from radial and/or pressure-dependent, temporary deformations of the measuring tube, have a minimum in the region of the projection.

In an eighteenth embodiment of the invention, it is provided, that a permanent magnet of the oscillation sensor is affixed to the projection of the first securement element.

In a nineteenth embodiment of the invention, it is provided, that a magnet coil of the oscillation sensor is affixed to the projection of the first securement element. In a further development of this embodiment of the invention, the measuring transducer further includes a second securement element, especially a second securement element essentially equally constructed or identical to the first securement element, wherein the second securement element has an essentially rectangular, outer perimeter and a projection protruding therefrom for holding a permanent magnet of the oscillation sensor. Additionally, it is provided, that the magnet coil of the oscillation sensor is so affixed to the projection of the first securement element and the permanent magnet of the oscillation sensor is so affixed to the projection of the second securement element, that a longitudinal axis of the magnet coil is essentially aligned with a longitudinal axis of the permanent magnet.

In a twentieth embodiment of the invention, it is provided, that the at least one measuring tube is excited during operation, especially by means of an electrodynamic exciter mechanism, at least at times, in a wanted mode, in which it executes, especially predominantly, or exclusively, bending oscillations about an oscillation axis, especially an oscillation axis parallel to a longitudinal axis of the measuring transducer connecting ends of the at least one measuring tube, especially with a single frequency and/or with one of its resonance frequencies.

In a first further development of the twentieth embodiment of the invention, the first securement element is so placed and oriented in the measuring transducer, that a principle axis of inertia corresponding to a smallest mass moment of inertia of the first securement element is essentially perpendicular to the oscillation axis.

In a second further development of the twentieth embodiment of the invention, the first securement element is so placed and oriented in the measuring transducer, that a principle axis of inertia corresponding to a smallest mass moment of inertia of the first securement element is essentially perpendicular to a plane of oscillation swept by the bending oscillations of the measuring tube.

In a third further development of the twentieth embodiment of the invention, the first securement element is so placed and oriented in the measuring transducer, that a principle axis of inertia corresponding to a smallest mass moment of inertia of the first securement element is essentially perpendicular to movements of the securement element accompanying the bending oscillations of the measuring tube.

In a fourth further development of the twentieth embodiment of the invention, the first securement element is so placed and oriented in the measuring transducer, that a principle axis of inertia corresponding to a smallest mass moment of inertia of the first securement element extends at a distance amounting to, at most, 50% of the width of the projection from a midpoint, especially a center of area, of a tube cross section of the at least one measuring tube encircled by the securement element.

In a fifth further development of the twentieth embodiment of the invention, the first securement element is so placed and oriented in the measuring transducer, that a principle axis of inertia corresponding to a smallest mass moment of inertia of the first securement element coincides with a diameter of the measuring tube extending within a tube cross section of the at least one measuring tube surrounded by the securement element.

In a sixth further development of the twentieth embodiment of the invention, the first securement element is so placed and oriented in the measuring transducer, that a principle axis of inertia corresponding to a largest mass moment of inertia of the first securement element is essentially parallel to the oscillation axis.

In a seventh further development of the twentieth embodiment of the invention, the first securement element is so placed and oriented in the measuring transducer, that a principle axis of inertia corresponding to a largest mass moment of inertia of the first securement element is essentially parallel to a plane of oscillation swept by the bending oscillations of the measuring tube.

In an eighth further development of the twentieth embodiment of the invention, the first securement element is so placed and oriented in the measuring transducer, that a principle axis of inertia corresponding to a largest mass moment of inertia of the first securement element is essentially perpendicular to movements of the securement element accompanying the bending oscillations of the measuring tube.

In a ninth further development of the twentieth embodiment of the invention, the first securement element is so placed and oriented in the measuring transducer, that a principle axis of inertia corresponding to a largest mass moment of inertia of the first securement element extends at a distance amounting to, at most, 50% of the width of the projection from a midpoint, especially a center of area, of a tube cross section of the at least one measuring tube encircled by the securement element.

In a twenty-first embodiment of the invention, it is provided, that the securement element is embodied essentially mirror symmetrically as regards a principle axis of inertia corresponding to a smallest mass moment of inertia of the first securement element, especially also as regards an imaginary cutting plane of the securement element imaginarily determined by the principle axis of inertia associated with a largest mass moment of inertia of the securement element and the principle axis of inertia associated with the smallest mass moment of inertia of the securement element.

In a twenty-second embodiment of the invention, it is provided, that the first securement element has a greatest axial areal moment of inertia with respect to one of its gravitational axes, especially a greatest axial areal moment of inertia determined by an outer diameter of the measuring tube, the height, the total width, as well as width and height of the projection and/or lying in an imaginary cross sectional plane of the at least one measuring tube.

In a first further development of the twenty-second embodiment of the invention, it is additionally provided, that the first securement element is so placed and oriented in the measuring transducer, that the gravitational axis, to which the greatest axial areal moment of inertia is referenced, is essentially parallel to the oscillation axis.

In a second further development of the twenty-second embodiment of the invention, it is additionally provided, that the first securement element is so placed and oriented in the measuring transducer, that the gravitational axis, to which the greatest axial areal moment of inertia is referenced, extends essentially parallel to a plane of oscillation swept by the bending oscillations of the measuring tube.

In a third further development of the twenty-second embodiment of the invention, it is additionally provided, that the first securement element is so placed and oriented in the measuring transducer, that the gravitational axis, to which the greatest axial areal moment of inertia is referenced, is essentially perpendicular to movements of the securement element accompanying the bending oscillations of the measuring tube.

In a fourth further development of the twenty-second embodiment of the invention, it is additionally provided, that the first securement element is so placed and oriented in the measuring transducer, that the gravitational axis, to which the greatest axial areal moment of inertia is referenced, extends at a distance amounting to, at most, 50% of the width of the projection from a midpoint, especially a center of area, of a tube cross section of the at least one measuring tube encircled by the securement element.

In a fifth further development of the twenty-second embodiment of the invention, it is additionally provided, that the first securement element is so placed and oriented in the measuring transducer, that the gravitational axis, to which the greatest axial areal moment of inertia is referenced, coincides with a diameter of the measuring tube extending within a tube cross section of the at least one measuring tube encircled by the securement element.

In a twenty-third embodiment of the invention, it is provided, that the measuring transducer includes at least two measuring tubes vibrating at least at times during operation, especially opposite-equally, especially measuring tubes mechanically coupled with one another by means of an inlet side distributor piece and an outlet side distributor piece and/or by means of at least one inlet side coupling element and at least one outlet side coupling element, and/or constructed equally to one another and/or curved and/or parallel to one another. Developing this embodiment of the invention further, it is additionally provided, that the at least one, especially electrodynamic, oscillation sensor differentially registers vibrations of the at least two, especially identical and/or U or V shaped, measuring tubes.

The measuring transducer of the invention is distinguished by the fact that it has, in comparison to the measuring transducer known from the state of the art, a smaller cross-sensitivity to pressure, or a smaller dependence of the accuracy of measurement on the internal pressure reigning in the measuring tube; this, especially, also in comparison to conventional measuring transducers with securement elements as in U.S. Pat. No. 6,047,457. It has, in such case, namely, been surprisingly found, that, in the case of application of a securement element with rectangular outer perimeter and therefrom protruding projection, a, for the desired high accuracy of measurement, better distribution of the radial forces accompanying pressure fluctuations can be achieved, than with conventional securement elements of the type being discussed, especially also those of U.S. Pat. No. 6,047,457. This expresses itself especially in the fact that the radial forces and their spatial distribution in the securement element can be influenced in such a manner, that they have a minimum in the region of the projection. The residual radial forces remaining in the region of the projection, or the deformations of the same associated therewith, are, additionally, far smaller, than those in the case of conventional measuring transducers of the type being discussed with otherwise essentially comparable dimensioning of measuring tube and conventional securement element.

BRIEF DESCRIPTION OF THE DRAWINGS

The invention and further advantages thereof will now be explained on the basis of an example of an embodiment shown in the figures of the drawing. Equal parts are provided in the figures with equal reference characters. The figures of the drawing show as follows.

DETAILED DESCRIPTION IN CONJUNCTION WITH THE DRAWINGS

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the intended claims.

Figure 1:
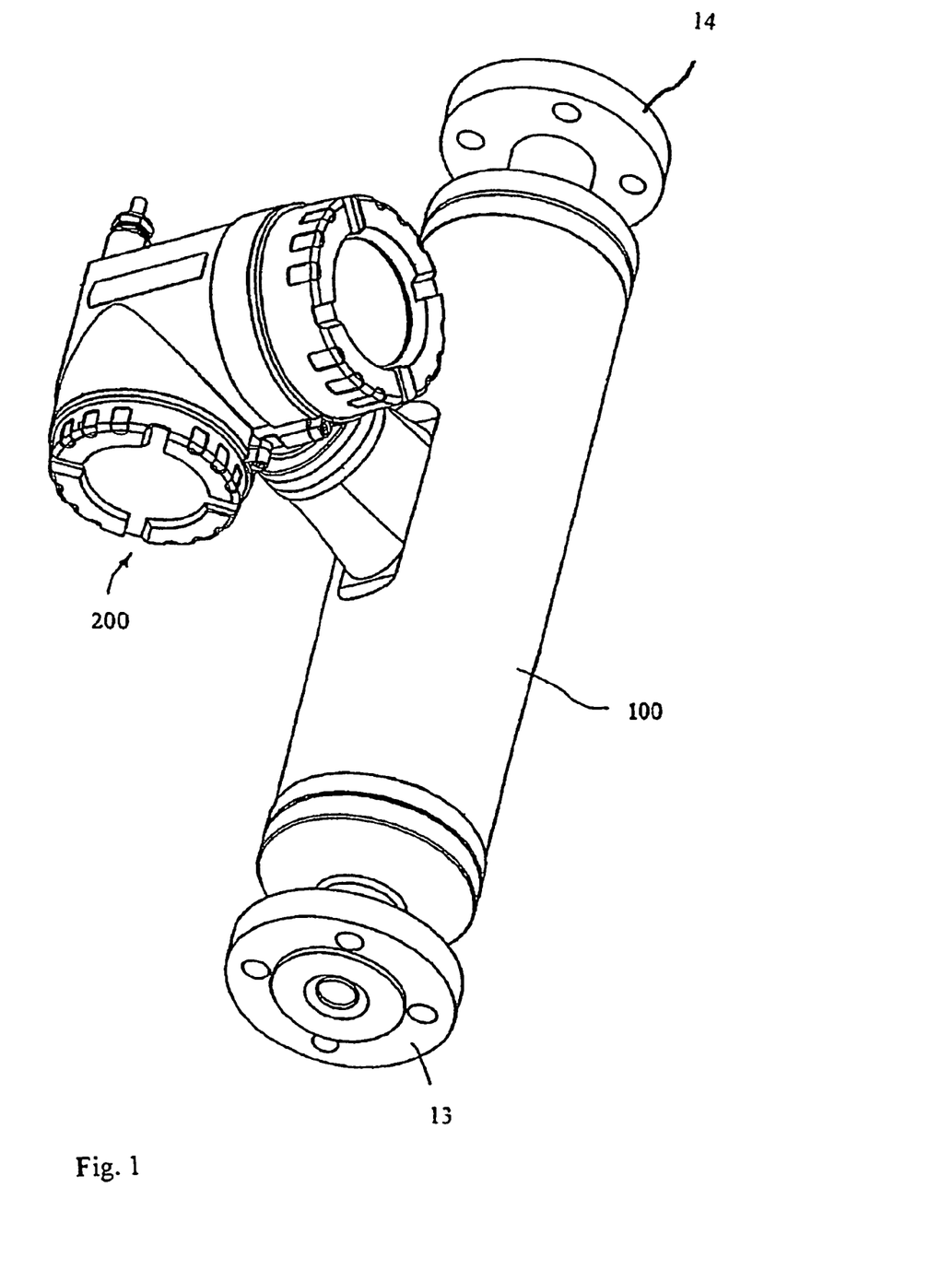
FIG. 1 in perspective, side view, an inline measuring device for media flowing in pipelines.

FIG. 1 shows a measuring system insertable in a process line (not shown), for instance a pipeline of an industrial plant, for example, in the form of a Coriolis mass flow measuring device, density measuring device, viscosity measuring device, pressure measuring device or the like, which serves for measuring and/or monitoring at least one physical, measured variable, for example, a mass flow, a density, a viscosity etc., of a medium flowing in the process line. The measuring system (embodied here as an inline measuring device in compact construction) includes therefor a measuring transducer of vibration-type, which is connected to the process line via an inlet end as well as an outlet end, through which the medium to be measured flows during operation and which is electrically connected to a driver electronics of the measuring system serving for driving the measuring transducer as well as to an evaluating electronics of the measuring system, which processes primary signals of the measuring transducer, which, in given cases, communicates during operation also with the driver electronics, and which delivers, during operation, measured values representing the at least one measured variable. The driver electronics and the evaluating electronics as well as other electronic components serving the operation of the measuring system, such as, for instance, internal energy supply circuits and/or communication circuits serving for connection to a superordinated, measurement data, processing system and/or to a fieldbus, are additionally accommodated in a corresponding electronics housing 200, especially an electronics housing, which is formed impact resistantly and/or also explosion resistantly.

Figure 2:
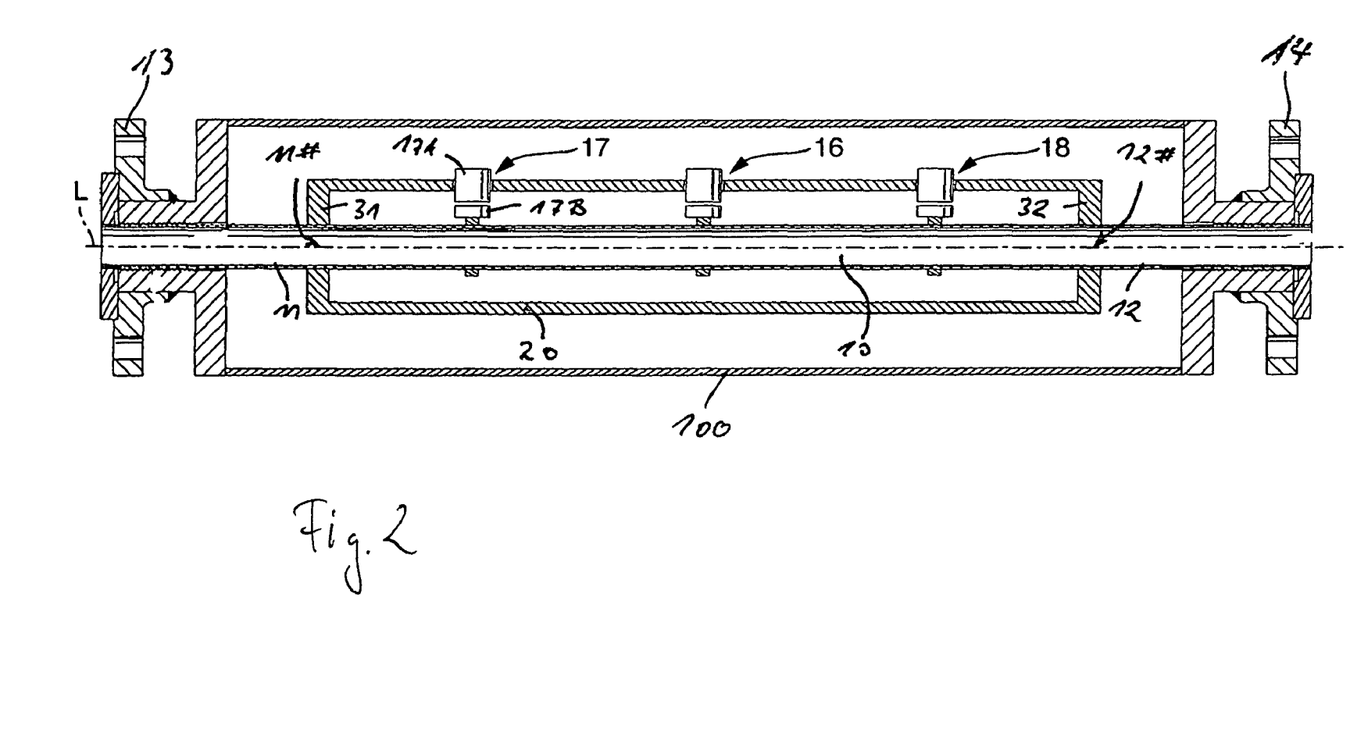
FIG. 2 in a sectioned, side view, a measuring transducer of vibration type suited for an inline measuring device of FIG. 1.

FIG. 2 shows, strongly simplified and schematically, an example of an embodiment for such a measuring transducer of vibration-type. The measuring transducer serves to produce, in a medium flowing through it, mechanical reaction forces, e.g. mass flow dependent, Coriolis forces, density dependent, inertial forces and/or viscosity dependent, frictional forces, which react measurably, especially registerably by sensor, on the measuring transducer. In manner known to those skilled in the art, there can be derived from these reaction forces e.g. measurements of mass flow m, density ρ and/or viscosity η of the medium. The measuring transducer includes therefor a transducer housing 100 as well as, arranged in the transducer housing 100, an inner part actually effecting the physical-to-electrical conversion of the at least one parameter to be measured.

For conveying the medium, the inner part includes at least one measuring tube 10, which, in the example of an embodiment illustrated in FIG. 2, is a single, essentially straight, measuring tube, which is caused, during operation, to vibrate, and which is, in such case, deformed oscillatingly, repeatedly elastically about a static resting position. As a precaution, it is expressly noted, here, that although the measuring transducer in the example of an embodiment illustrated in FIG. 2 has a single, straight, measuring tube and thus, at least as regards its mechanical construction, as well as also its principle of action. resembles the subject matter disclosed in the initially mentioned EP-A 317 340, U.S. Pat. No. 7,299,699, U.S. Pat. No. 7,073,396, U.S. Pat. No. 7,040,179, U.S. Pat. No. 7,017,424, U.S. Pat. No. 6,840,109, U.S. Pat. No. 6,691,583, U.S. Pat. No. 6,651,513, U.S. Pat. No. 6,397,685, U.S. Pat. No. 6,330,832, U.S. Pat. No. 6,047,457, U.S. Pat. No. 5,979,246, U.S. Pat. No. 5,945,609, U.S. Pat. No. 5,796,012, U.S. Pat. No. 5,796,010, U.S. Pat. No. 5,691,485, U.S. Pat. No. 5,531,126, U.S. Pat. No. 5,476,013, U.S. Pat. No. 5,398,554, U.S. Pat. No. 5,291,792, U.S. Pat. No. 4,823,614, of course, also other measuring transducers of vibration-type, especially also those with more than one measuring tube and/or with bent measuring tubes, can serve for implementing the invention. For example, the at least one measuring tube and, thus, also a center line extending within its lumen, can be. at least sectionally, essentially S, Ω, or U shaped or, such as shown e.g. in U.S. Pat. No. 6,860,158, U.S. Pat. No. 6,666,098, U.S. Pat. No. 7,213,469, or U.S. Pat. No. 7,360,451, at least sectionally essentially V shaped. Examples of other suitable measuring tube forms for implementing the invention are, moreover, described in, among others, the initially mentioned U.S. Pat. No. 5,287,754, U.S. Pat. No. 5,602,345, U.S. Pat. No. 5,796,011, U.S. Pat. No. 6,311,136, U.S. Pat. No. 6,758,102, U.S. Pat. No. 5,731,527, U.S. Pat. No. 5,301,557, or U.S. Pat. No. 6,920,798.

In operation of the measuring transducer, the measuring tube 10, such as usual in the case of such measuring transducers, is so excited to execute bending oscillations in the so-called wanted mode (for example, at an exciter frequency $f_{exc}$ essentially corresponding to a natural resonance frequency) that it bends out oscillatingly from a bending oscillation axis, which is here essentially parallel to or even coincident with a longitudinal axis L of the measuring transducer connecting its inlet and outlet ends, at least partially essentially according to a natural, first, eigenoscillation form. For the operationally provided case, wherein medium is flowing in the process line and, thus, the mass flow m is different from zero, Coriolis forces are also induced in the through-flowing medium by means of the measuring tube 10 vibrating in above-described manner. These, in turn, react on the measuring tube 10 and effect, so, an additional, sensorially registerable deformation of the same essentially according to a natural, second, eigenoscillation form. An instantaneous form of this so-called Coriolis mode superimposed with equal frequency on the excited, wanted mode is, in such case, especially as regards its amplitude, dependent also on the instantaneous mass flow m. The second eigenoscillation form can, as usual in the case of such measuring transducers with straight measuring tube, be e.g. the eigenoscillation form of an antisymmetric bending oscillation mode essentially coplanar with the wanted mode.

For minimizing disturbing influences acting on the measuring tube 10, as well as, thus, for reducing oscillatory energy released by the measuring transducer to the connected process line, additionally provided in the measuring transducer is a counteroscillator 20. This is, as shown in FIG. 2, arranged in the measuring transducer laterally spaced from the measuring tube 10, except that it is affixed to the measuring tube 10 on the inlet side to form a first coupling zone 11#—essentially defining an inlet end of the measuring tube 10—and on the outlet side to form a second coupling zone 12#—essentially defining an outlet end of the measuring tube 10. The counteroscillator 20—extending, in the illustrated example of an embodiment, essentially parallel to the measuring tube 10, in given cases, also coaxially arranged therewith—can be, for example, tubular or also essentially box-shaped. In the example of an embodiment shown here, the counteroscillator 20 is held by means of at least one, inlet side, first coupler 31 on the inlet end 11# of the measuring tube 10 and by means of at least one, outlet side, second coupler 32 (especially one essentially identical to the coupler 31) on the outlet end 12# of the measuring tube 10. Serving as coupler 31, 32 can be, in such case, e.g. simple node plates, which are secured in corresponding manner on the inlet side and on the outlet side, in each case, to measuring tube 10 and counteroscillator 20, for instance, by pressing on and/or soldering on of corresponding metal bodies according to the initially mentioned U.S. Pat. No. 6,047,457 or U.S. Pat. No. 6,168,069.

As schematically indicated in FIG. 2, the measuring tube 10 is additionally connected to the process line (not shown), respectively, supplying and draining the medium. The connection is effected via a straight, first connecting tube piece 11 on the inlet side in the region of the first coupling zone 11# and via a straight, second connecting tube piece 12 (especially a straight, second connecting tube piece 12 essentially identical to the first connecting tube piece 11) on the outlet side in the region of the second coupling zone 12#, wherein an inlet end of the inlet side connecting tube piece 11 essentially forms the inlet end of the measuring transducer and an outlet end of the outlet side connecting tube piece 12 essentially forms the outlet end of the measuring transducer. In advantageous manner, the measuring tube 10 and the two connecting tube pieces 11, 12 can be executed as one piece, so that e.g. a single piece of tubular stock, or semifinished part, can serve for their manufacture. Instead of forming measuring tube 10, inlet tube piece 11 and outlet tube piece 12 by segments of a single, one piece tube, these can, in case required, however, also be produced by means of individual, subsequently joined together, e.g. welded together, pieces of stock, or semifinished parts. For manufacture of the measuring tube 10, moreover, essentially any of the usual materials for such measuring transducers, such as e.g. steel, Hastelloy, titanium, zirconium, tantalum, etc., can be used.

As evident from the combination of FIGS. 1 and 2, furthermore, the, especially in comparison to the measuring tube 10, bending and torsion resistant, transducer housing 100 is affixed, especially rigidly, to a, as regards the first coupling zone 11#, distal inlet end of the inlet side connecting tube piece 11 as well as to a, as regards the first coupling zone 11#, distal outlet end of the outlet side connecting tube piece 12. As a result, thus, the entire inner part is not only completely encased by the transducer housing 100, but, also, as a result of the mass of the inner part and the spring action of both connecting tube pieces 11, 12, it is also held oscillatably in the transducer housing 100. Additionally to accommodating the inner part, the transducer housing 100 can also serve to hold the electronics housing 200 of the inline measuring device with therein accommodated, driving, and evaluating, electronics. For the case, in which the measuring transducer is to be assembled releasably with a process line in the form of, for example, a metal pipeline, the inlet side connecting tube piece 11 is additionally provided on its inlet end with a first connecting flange 13 of the measuring transducer and the outlet side connecting tube piece 12 on an outlet end with a second connecting flange 14 of the measuring transducer. The connecting flanges 13, 14 can, in such case, such as quite usual in the case of measuring transducers of the described type, also be integrated, at least partially, terminally, in the transducer housing 100. In case required, the connecting tube pieces 11, 12 can, moreover, however, also be directly connected with the process line, e.g. by means of welding, brazing or hard soldering.

For exciting mechanical oscillations of the measuring tube 10, especially the bending oscillations in the wanted mode, as well as of the, in given cases, present counteroscillator 20, the measuring transducer includes, additionally, an exciter mechanism 16, especially an electrodynamic exciter mechanism. This serves, triggered by an exciter signal, e.g. having a controlled electrical current and/or a controlled voltage, delivered by the driver electronics and, in given cases, correspondingly conditioned in interaction with the evaluating electronics, to convert electrical exciter energy $E_{exc}$ injected by means of the driver electronics into an exciter force $F_{exc}$ acting on the measuring tube 10, e.g. with pulse shape or harmonically, for deflecting such in the above-described manner. For tuning the exciter energy $E_{exc}$, suitable driver electronics are sufficiently known to those skilled in the art and disclosed e.g. in U.S. Pat. No. 4,777,833, U.S. Pat. Nos. 4,801,897, 4,879,911 or U.S. Pat. No. 5,009,109. The exciter force $F_{exc}$ can, such as usual in the case of such measuring transducers, be constituted bidirectionally or unidirectionally and, in manner known to those skilled in the art, tuned e.g. by means of an electrical current and/or voltage, control circuit, as regards its amplitude and, e.g. by means of a phase control loop, as regards its frequency. Serving as exciter mechanism 16 can be e.g. an electrodynamic oscillation exciter, which is formed by means secured on the counteroscillator 20 in the form of a cylindrical exciter coil, through which a corresponding exciter current flows during operation, and, associated therewith, is permeated by a corresponding magnetic field, as well as by means of a permanently magnetic armature, which plunges, at least partially, into the exciter coil, and which is affixed externally, especially centrally, on the measuring tube 10. Other exciter mechanisms also quite suitable for the measuring system of the invention for exciting oscillations of the at least one measuring tube are shown e.g. in the initially mentioned U.S. Pat. No. 6,557,422, U.S. Pat. No. 6,092,429, U.S. Pat. No. 4,823,614, U.S. Pat. No. 6,223,605 or U.S. Pat. No. 5,531,126.

In an additional embodiment of the invention, the at least one measuring tube is excited during operation by means of the exciter mechanism 16, at least at times, in a wanted mode, in which it, at least partially, especially predominantly or exclusively, executes bending oscillations about the oscillation axis connecting inlet and outlet ends of the measuring tube with one another, for example, with a single one, and/or a lowest, of its resonance frequencies. The bending oscillations of the measuring tube have, in such case, in the region of the inlet side coupling zone 11# defining the inlet side end of the measuring tube, an inlet side oscillation node, and, in the region of the outlet side coupling zone 11# defining the outlet side end of the measuring tube, an outlet side oscillation node. In the case of the example of an embodiment illustrated in FIG. 2, the measuring tube 10 executes the bending oscillations relative to counteroscillator 20 and longitudinal axis L. In the case of an exciter mechanism acting differentially on measuring tube and counteroscillator, also the counteroscillator 20 is compelled to execute, simultaneously, bending oscillations essentially coplanar with the bending oscillations of the measuring tube, and, indeed, in such a manner, that it oscillates at least partially out of phase, especially essentially with opposite phase, to the measuring tube 10 oscillating in the wanted mode. Especially, measuring tube 10 and counteroscillator 20 are, in such case, additionally to be so matched to one another, or so excited, that they execute, at least at times during operation and at least partially, bending oscillations about the longitudinal axis L, which are opposite-equal, thus of equal frequency, however, of essentially opposite phase. The bending oscillations can, in such case, be so embodied, that they are of equal modal order and, thus, at least in the case of resting fluid, essentially equally shaped. In an additional embodiment of the invention, the exciter, or also wanted mode, frequency, $f_{exc}$, in such case, is so tuned, that it corresponds, as much as possible, to exactly a, for example, smallest, natural eigenfrequency of bending oscillations of the measuring tube 10.

In the case of the example of an embodiment illustrated in FIG. 2, it is additionally provided, that the two connecting tube pieces 11, 12, are so oriented relative to one another as well as to a longitudinal axis L of the measuring transducer connecting the two coupling zones 11#, 12#, that the inner part, coupled with twisting of the two connecting tube pieces 11, 12, can move like a pendulum about the longitudinal axis L. For such purpose, the two connecting tube pieces 11, 12 are to be so oriented relative to one another, that the essentially straight tube segments extend essentially parallel to the longitudinal axis L, or to the oscillation axis of the bending oscillations of the measuring tube, such that the tube segments essentially align both with the longitudinal axis L as well as, thus, relative to one another. Since the two connecting tube pieces 11, 12 in the here illustrated example of an embodiment are essentially straight essentially over their entire length, they are, accordingly, essentially oriented aligned as a whole relative to one another as well as with the longitudinal axis L.

For registering oscillations of the measuring tube 10, the measuring transducer includes, additionally, at least one oscillation sensor 17, here arranged on the inlet side of the measuring tube, for producing at least one primary signal of the measuring transducer representing vibrations of the measuring tube 10. As usual in the case of measuring system of the type being discussed, the measuring transducer can additionally include at least one additional, second oscillation sensor 18, for example, placed on the outlet side on the measuring tube and/or essentially with construction equal to that of oscillation sensor 17, which delivers at least one, further, for example, outlet side, primary signal of the measuring transducer representing vibrations of the at least one measuring tube 10.

In the example of an embodiment shown here, the first oscillation sensor 17 on the inlet side and the second oscillation sensor 18 on the outlet side are arranged on the at least one measuring tube, so that the measuring transducer can be used, for example, also in a measuring system formed as a Coriolis, mass flow, measuring device. Furthermore, the first oscillation sensor 17, such as quite usual in the case of such measuring transducers of vibration-type, is arranged in the measuring transducer on the same side of the measuring tube as that on which the oscillation exciter is arranged. Additionally, also the second oscillation sensor 18 is arranged in the measuring transducer on a side of the measuring tube occupied by the first oscillation sensor 17, especially at the same distance from the at least one oscillation exciter as is the first oscillation sensor 17. The oscillation sensors 17, 18 can be e.g. electrodynamic, velocity sensors measuring the oscillations relative, especially differentially, to the counteroscillator. In case required, additionally, in manner known to those skilled in the art, still other sensors required for the measuring and/or operation of the measuring transducer can be provided, such as e.g. additional acceleration sensors arranged on the counteroscillator 20 and/or on the transducer housing 100; compare, for this, also U.S. Pat. No. 5,736,653, or e.g. also temperature sensors and/or strain gages can be arranged on the measuring tube 10, on the counteroscillator 20 and/or on the transducer housing 100; compare, for this, also U.S. Pat. No. 4,768,384, U.S. Pat. No. 7,040,179 or WO-A 00/102816.

Figure 3:
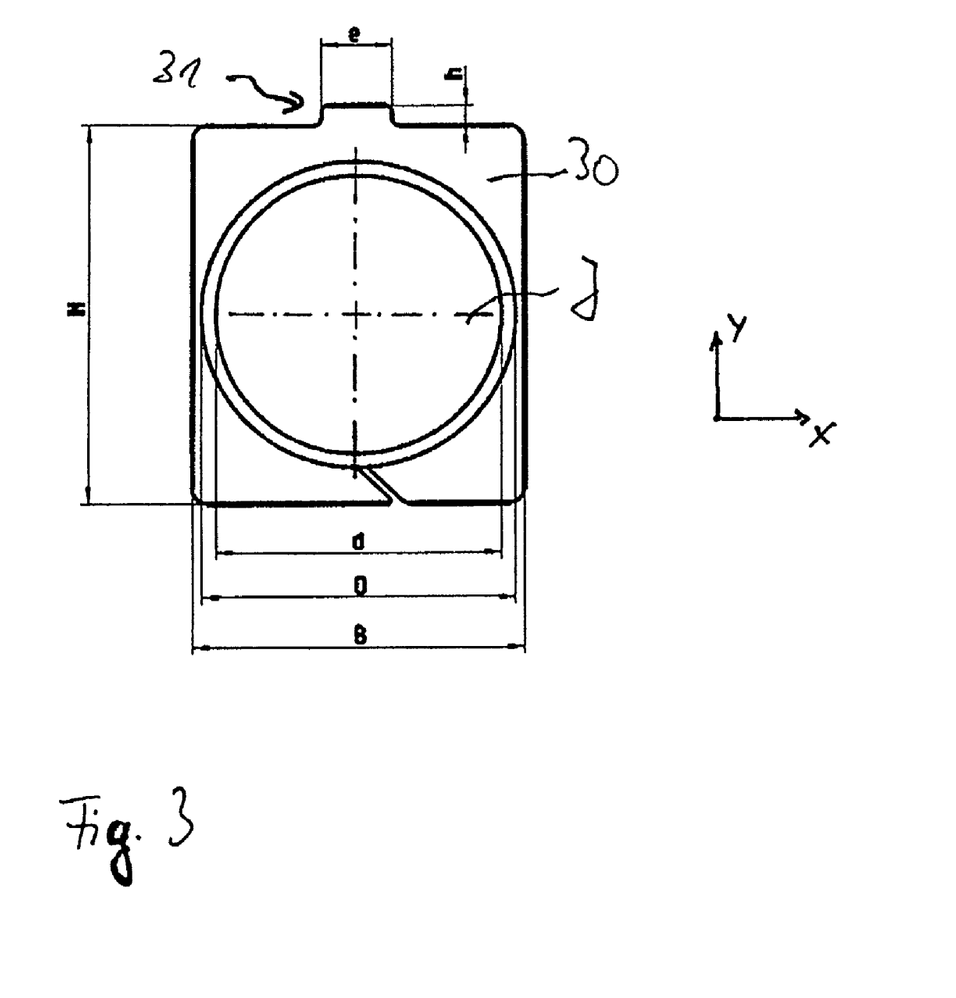
FIG. 3 in a sectioned side view, a portion of the measuring transducer of FIG. 2.

Serving for holding at least one component of the first oscillation sensor 17, for example, a magnet coil 17A or a permanent magnet 17B, there is provided on the at least one measuring tube 10, essentially encircling it fixedly, especially completely, along one of its imaginary circumferential lines, a first securement element 30, especially a metal and/or essentially washer shaped, first securement element, of which an example of an embodiment is schematically presented in FIG. 3. A material for the securement element 30 can be e.g. a metal alloy compatible with the tube material, for instance, a titanium or a steel, or a ceramic meeting these considerations. The securement element 30 has, in the case of the measuring system of the invention, an essentially rectangular outer perimeter with, protruding out therefrom by a height h and serving for holding the at least one component of the oscillation sensor, a projection 31 having a width e at least equal to the height h of the projection 31 and/or smaller than a total width B of the securement element. The total width B of the securement element 30, in turn, is greater than a greatest outer diameter D of the measuring tube. The projection 31 is, in the illustrated example of an embodiment, essentially centrally arranged on a side defining the total width B of the securement element 30; in case required, it can, however, also be placed somewhat outside of center on the aforementioned side. In an additional embodiment of the invention, the projection additionally is so embodied, that its width e amounts to less than 60% of the total width B of the securement element. In the example of an embodiment shown here, the securement element 30 is, furthermore, so embodied, that a side defining a height H of the securement element, which is essentially perpendicular to a side defining the total width B of the securement element, is greater than the total width B of the securement element.

Especially, the securement element 30, formed, for example, as one piece and/or as a stamped part, is so dimensioned, that temporary elastic deformations of the same, especially such, which effect deformations of the outer perimeter of the securement element 30 directed at least partially radially with respect to the measuring tube and/or the longitudinal axis L, have a minimum in the region of the projection 31. Such deformations of the outer perimeter can, for example, be the result of radial and/or pressure dependent, temporary deformations of the measuring tube, brought about, for instance, by pressure surges or extreme pressure fluctuations in the medium to be measured.

In an additional embodiment of the invention, the securement element 30 is additionally so placed and oriented in the measuring transducer therefor, that a gravitational axis, to which a greatest axial areal moment of inertia J is referenced, is essentially parallel to the oscillation axis of the measuring tube, or essentially parallel to a plane of oscillation (LX) swept out by the bending oscillations of the measuring tube. In the case of the example of an embodiment illustrated in FIG. 3, the securement element 30 is additionally so oriented, that the aforementioned gravitational axis is essentially perpendicular to movements of the securement element accompanying the bending oscillations of the measuring tube—here thus executed essentially in the X direction. The greatest axial areal moment of inertia J of the securement element is essentially determined by an outer diameter D, the height H, the total width B as well as the width e and height h of the projection 31 and corresponds in the present example of an embodiment essentially to the relationship $$J = \frac{BH^3}{12} - \frac{\pi}{64}D^4 + \frac{eh^3}{12} + \left(\left(\frac{H+h}{2}\right)\right)^2 \cdot eh.$$

For the mentioned case, in which the securement element 30 is essentially washer shaped, thus, as seen in the direction of the longitudinal axis of the measuring transducer, it has, in comparison to the total width B and to the height H, a significantly smaller length, the first securement element 30 is, as a result, thus, also so placed and oriented in the measuring transducer, that a principle axis of inertia corresponding to a largest mass moment of inertia of the securement element 30 is oriented essentially parallel to the oscillation axis, especially coincides therewith, or is essentially parallel to a plane of oscillation swept by the bending oscillations of the measuring tube. In the case of the example of an embodiment illustrated in FIG. 3, the aforementioned principle axis of inertia corresponding to the largest mass moment of inertia of the securement element 30 is, consequently, essentially perpendicular to movements of the securement element 30 accompanying the bending oscillations of the measuring tube—here essentially executed in the X direction.

Furthermore, at least for the case, in which the securement element 30 is essentially washer shaped, a principle axis of inertia corresponding to a smallest mass moment of inertia of the securement element is essentially perpendicular to the oscillation axis, or essentially perpendicular to a plane of oscillation swept by the bending oscillations of the measuring tube. In the case of the example of an embodiment illustrated in FIG. 3, thus, also the aforementioned principle axis of inertia corresponding to the smallest mass moment of inertia of the securement element extends essentially perpendicular to movements of the securement element accompanying the bending oscillations of the measuring tube. The securement element is embodied in advantageous manner additionally to be essentially mirror symmetric with respect to this principle axis of inertia associated with the smallest mass moment of inertia, especially also with respect to an imaginary cutting plane of the securement element, as defined by the principle axis of inertia associated with the largest mass moment of inertia and the principle axis of inertia associated with the smallest mass moment of inertia.

The securement element is, according to an additional embodiment of the invention, additionally so placed and so oriented in the measuring transducer, that at least the principle axis of inertia corresponding to its smallest mass moment of inertia extends at a smallest possible distance from a midpoint, for instance, a center of area, of a tube cross section of the at least one measuring tube surrounded by the securement element. The distance between this principle axis of inertia and the midpoint of the tube cross section is, in such case, in advantageous manner so selected, that it—in case possible— is equal to zero, so that, thus, at least the principle axis of inertia corresponding to the smallest mass moment of inertia of the securement element 30 coincides with a diameter of the measuring tube extending within the tube cross section. At most, however, this distance amounts to 50% of the width e of the projection 31. In the case of the example of an embodiment illustrated in FIG. 3, additionally also the principle axis of inertia of the securement element corresponding to the largest mass moment of inertia, or the gravitational axis corresponding to its largest axial areal moment of inertia J, passes at a small distance from the aforementioned midpoint of the tube cross section of the at least one measuring tube, and, in given cases, also coincides with a diameter of the measuring tube extending in the tube cross section.

Investigations have additionally shown, that, through targeted dimensioning of the securement element 30 as a whole, especially also the projection 31, relative to the measuring tube 10, the pressure sensitivity of the measuring transducer can be lessened still further.

In an additional embodiment of the invention, the securement element 30 is, consequently, so dimensioned, that the width e of the projection 31 is at least equal to the wall thickness s of the measuring tube 10, especially greater than the wall thickness s of the measuring tube 10. Alternatively thereto or in supplementation thereof, also the height h of the projection is selected to be at least equal to the wall thickness s of the measuring tube 10 or, however, greater than the wall thickness s. It has additionally been found to be advantageous that the width e of the projection 31 be at least twice the wall thickness s of the measuring tube 10, especially more than triple the wall thickness s of the measuring tube 10 and/or that the total width B of the securement element be larger than 6-times the wall thickness s of the measuring tube.

The securement element 30 can be affixed to the measuring tube by means of the methods known to those skilled in the art and described in, among others, also the initially mentioned U.S. Pat. No. 6,168,069, U.S. Pat. No. 6,047,457, U.S. Pat. No. 7,299,699, US-A 2006/0201260, U.S. Pat. No. 5,610, 342, or U.S. Pat. No. 6,519,828, for example, to form an at least pointwise connection, especially a force interlocking and/or shape interlocking connection sectionally or over the complete circumference of the measuring tube, and/or an at least pointwise bonded connection, especially a bonded connection extending sectionally or over the complete circumference of the measuring tube. The affixing of the securement element to the measuring tube can be implemented e.g. by at least pointwise hard soldering or brazing, in given cases, also sectionally or over the complete circumference of the measuring tube, by at least pointwise welding or adhesive, in given cases, also sectionally or over the complete circumference of the measuring tube, by shrink fitting, by means of pressing from the outside, by means of hydraulic pressing from within the measuring tube and/or by means of rolling from within the measuring tube.

Especially, the securement element 30 is additionally so affixed to the measuring tube, for example, according to one of the aforementioned methods, that the securement element is subjected, in comparison to a beginning state, lastingly, to deformations, especially elastic or mixed plastic-elastic deformations, and/or that the securement element 30 is permanently prestressed, especially radially with respect to the measuring tube.

Figure 4A:
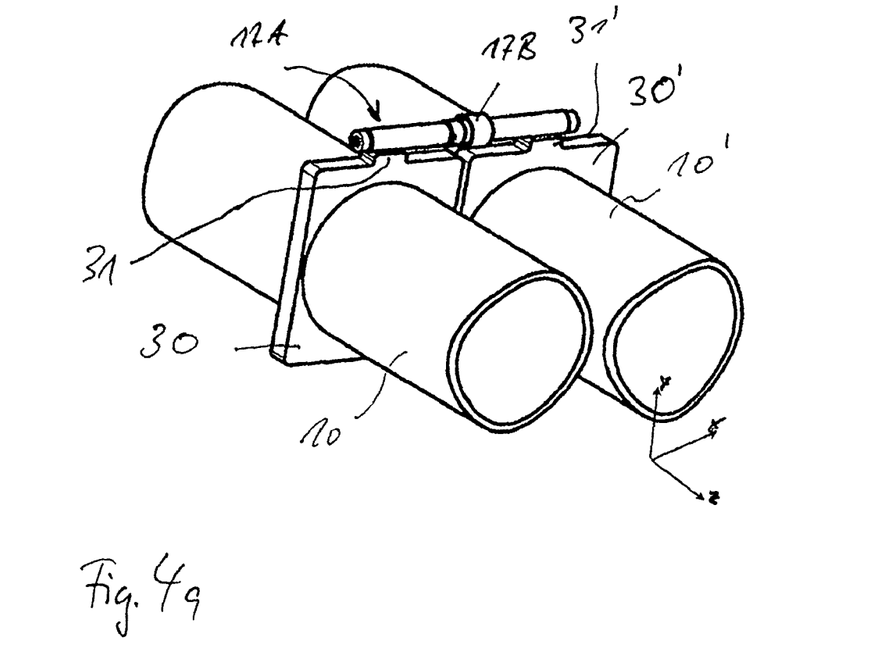
FIGS. 4a, and 4b in different, partially sectioned, side views, portions of an additional variant of a measuring transducer of vibration type suited for an inline measuring device of FIG. 1.
Figure 4B:
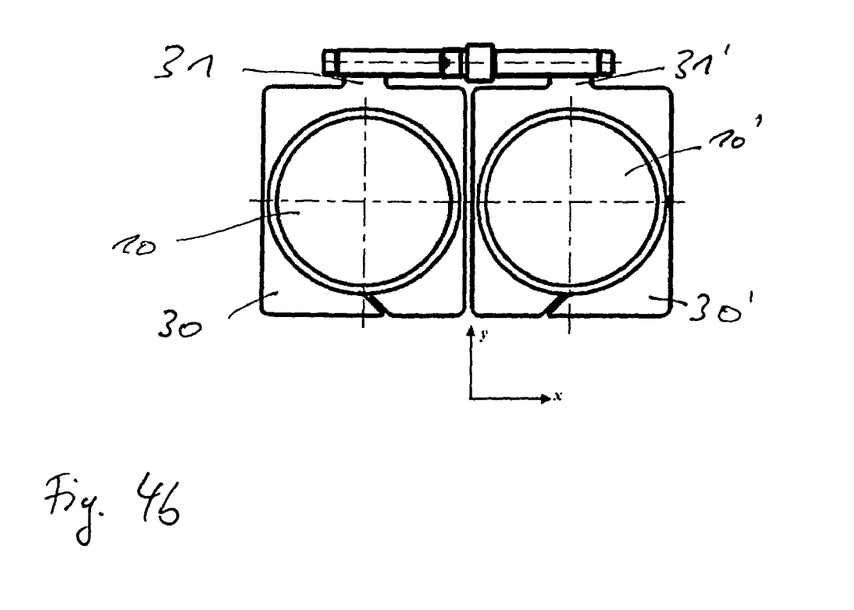

FIG. 4a shows a section of an additional measuring transducer schematically in perspective side view, while FIG. 4b shows the same measuring transducer in a partially sectioned, 2D, side view. The measuring transducer shown in FIG. 4a, b differs from that according to the example of an embodiment according to FIG. 2 essentially in the fact that, supplementally to the measuring tube 10, a further, here essentially thereto parallel and/or essentially identical pipe 10' is provided in the measuring transducer, on which, in turn, at least a second securement element 30' is affixed, especially a second securement element essentially equally constructed or identical to the first securement element 30, having, in turn, an essentially rectangular outer perimeter and a projection 31' protruding out therefrom for holding a component of the electrodynamic oscillation sensor (here differentially registering vibrations of the measuring tube and the additional tube), especially a component of the oscillation sensor complementary to that held by means of the first securement element 30.

The additional pipe 10' can, as quite usual in the case of such measuring transducers, be mechanically coupled to the measuring tube by means of at least one inlet side coupling element (not shown) and at least one outlet side coupling element (not shown). The coupling elements, especially essentially equally-constructed coupling elements, can, in such case, be e.g. simple plate-shaped, stamped parts or specially fitted, in given cases, also more complex, add-on parts, for instance, according to WO-A 08/059015, US-A 2008/ 10047361, U.S. Pat. No. 7,340,964. Suitable material for the coupling element includes, for example, again, a metal compatible with the tube material. Furthermore, the additional tube of the measuring transducer illustrated in FIG. 4a can be embodied, as shown in, among others, the initially mentioned U.S. Pat. No. 5,602,345, U.S. Pat. No. 5,796,011, U.S. Pat. No. 6,311,136, U.S. Pat. No. 6,758,102, U.S. Pat. No. 5,731, 527, U.S. Pat. No. 5,301,557, or U.S. Pat. No. 6,920,798, as a further measuring tube likewise serving for the conveying of medium to be measured or, such as proposed, for is example, in the mentioned U.S. Pat. No. 6,666,098, as a blind tube serving as counteroscillator. The two, especially equally-constructed, or identical, measuring tubes can, in turn, be formed in the manner usual for measuring transducers of the type being discussed, for example, thus to be at least sectionally curved, for instance, in the shape of an "Ω", "U" or "V", or, however, also, essentially straight. For the aforementioned case, in which the additional pipe 10' serves as a further measuring tube, the then at least two measuring tubes 10, 10' of the measuring transducer are coupled mechanically with one another in known manner by means of an inlet side distributor piece and an outlet side distributor piece to form flow paths mechanically coupled and communicating with one another.

In the example of an embodiment illustrated in FIG. 4a, the two securement elements 30, 30' are additionally arranged lying opposite one another in the measuring transducer, especially so that the gravitational axis of the first securement element 30, to which its greatest axial areal moment of inertia J is referenced, is essentially oriented parallel to a corresponding gravitational axis of the second securement element 30', to which a greatest of its axial areal moments of inertia is referenced, and/or the principle axis of inertia of the first securement element, to which its greatest mass moment of inertia is referenced, is essentially oriented parallel to a corresponding principle axis of inertia of the second securement element, to which a greatest of its mass moments of inertia is referenced. Furthermore, the two securement elements 30, 30' are so placed in the measuring transducer and so oriented relative to one another, that the mentioned principle axis of inertia of the first securement element 30, to which its smallest mass moment of inertia is referenced, is essentially oriented parallel to a corresponding principle axis of inertia of the second securement element 30', to which a smallest of its mass moments of inertia is referenced, especially also so that, such as directly evident from the combination of FIGS. 4a and 4b, each of the principle axes of inertia of the first securement element 30 is oriented parallel to an, in each case, corresponding principle axis of inertia of the second securement element 30' and/or the two securement elements 30, 30' essentially lie in a shared imaginary cutting plane of the measuring transducer and, thus, align with one another.

In an additional embodiment of the invention, it is further provided that, held on the projection 31 of the first securement element 30, especially embodied as a cylindrical coil, is magnet coil 17A of the oscillation sensor and, on the projection 31' of the second securement element 30', appropriately matching the magnet coil, especially at least partially plunging into the magnet coil and/or held by a magnet cup, a permanent magnet 17B of the oscillation sensor. Additionally, in the example of an embodiment illustrated in FIGS. 4a and b, the magnet coil of the oscillation sensor is so affixed to the projection of the first securement element, that an imaginary longitudinal axis of the magnet coil is oriented essentially in alignment with an imaginary longitudinal axis of the permanent magnet.

For the already multiply mentioned case, in which the measuring transducer includes, supplementally to the first oscillation sensor, at least a second oscillation sensor 18 arranged spaced from the first oscillation sensor on the measuring tube, the second oscillation sensor can be affixed to the at least one measuring tube 10 in the same manner as the first oscillation sensor 17 by means of a securement element of the invention.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. A measuring transducer of a vibration-type, comprising:
   at least one measuring tube showing a wall thickness (s) and vibrating, at least at times, during operation;
   at least one oscillation sensor, for producing at least one primary signal of the measuring transducer representing vibrations of the measuring tube; and
   at least a first securement element for holding a component of the oscillation sensor on said at least one measuring tube, said at least a first securement element fixedly encircling the measuring tube essentially along an imaginary circumferential line thereof and showing a total width (B), wherein:
   said at least a first securement element shows an essentially rectangular outer perimeter with a projection protruding out therefrom by a height (h), serving for holding the component of the oscillation sensor and showing a width (e), which is smaller than a total width (B) of the securement element.

2. The measuring transducer as claimed in claim 1, wherein:
   the height (h) of the projection is equal to the wall thickness (s) of the measuring tube.

3. The measuring transducer as claimed in claim 1, wherein:
   the width (e) of said projection is equal to the wall thickness (s) of said at least one measuring tube.

4. The measuring transducer as claimed in claim 1, wherein:
   the width (e) of said projection is at least twice the wall thickness (s) of said at least one measuring tube.

5. The measuring transducer as claimed in claim 1, wherein:
   the width (e) of said projection is less than 60% of the total width (B) of said first securement element.

6. The measuring transducer as claimed in claim 1, wherein:
   the width (e) of said projection is greater than its height (h).

7. The measuring transducer as claimed in claim 1, wherein:
   said projection is arranged on a side defining the total width (B) of said first securement element.

8. The measuring transducer as claimed in claim 1, wherein:
   a side, which defines a height (H) of said first securement element and which is essentially perpendicular to a side defining the total width (B) of said securement element, is longer than the total width (B) of said at least a first securement element.

9. The measuring transducer as claimed in claim 1, wherein:
   the total width (B) of said first securement element is greater than 6-times the wall thickness (s) of said at least one measuring tube.

10. The measuring transducer as claimed in claim 1, wherein:
    the total width (B) of said first securement element is greater than a greatest outer diameter (D) of said at least one measuring tube.

11. The measuring transducer as claimed in claim 1, wherein:
    said first securement element is subjected lastingly to deformations.

12. The measuring transducer as claimed in claim 1, wherein:
    first securement element is permanently prestressed.

13. The measuring transducer as claimed in claim 1, wherein:
    said first securement element is connected with said at least one measuring tube at least pointwise by force interlocking and/or shape interlocking.

14. The measuring transducer as claimed in claim 1, wherein:
    said first securement element is connected with said at least one measuring tube at least pointwise, by material bonding.

15. The measuring transducer as claimed in claim 1, wherein: said first securement element is soldered, with said at least one measuring tube at least pointwise.

16. The measuring transducer as claimed in claim 1, wherein:
said first securement element is welded to said at least one measuring tube at least pointwise.

17. The measuring transducer as claimed in claim 1, wherein:
said first securement element is adhered to said at least one measuring tube at least pointwise.

18. The measuring transducer as claimed in claim 1, wherein:
said first securement element is so dimensioned, that temporary elastic deformations of the same show a minimum in the region of said projection.

19. The measuring transducer as claimed in claim 1, wherein:
a permanent magnet of said at least one oscillation sensor is affixed to said projection of said first securement element.

20. The measuring transducer as claimed in claim 1, wherein: a magnet coil of said at least one oscillation sensor is affixed to said projection of said first securement element.

21. The measuring transducer as claimed in claim 1, further comprising:
a second securement element showing an essentially rectangular outer perimeter and a projection protruding out therefrom for holding a permanent magnet of said at least one oscillation sensor.

22. The measuring transducer as claimed in claim 21, wherein
a magnet coil of said at least one oscillation sensor is so affixed to the projection of said at least a first securement element and a permanent magnet of said at least one oscillation sensor is so affixed to said projection of said second securement element, that a longitudinal axis of said magnet coil is oriented essentially in alignment with a longitudinal axis of said permanent magnet.

23. The measuring transducer as claimed in claim 1, further comprising:
an electrodynamic exciter mechanism, wherein: said at least one measuring tube is excited, at least at times during operation in a wanted mode, in which it executes bending oscillations about and oscillation axis.

24. The measuring transducer as claimed in claim 23, wherein:
said first securement element is so placed and oriented in the measuring transducer, that a principle axis of inertia corresponding to a smallest mass moment of inertia of the said first securement element is at least one of:
essentially perpendicular to the oscillation axis,
essentially perpendicular to a plane of oscillation swept by the bending oscillations of said at least one measuring tube,
essentially perpendicular to movements of said at least a first securement element accompanying the bending oscillations of said at least one measuring tube,
coincident with a diameter of said at least one measuring tube extending within a tube cross section of said at least one measuring tube encircled by said at least a first securement element, and
spaced by a distance amounting to, at most, 50% of the width (e) of said projection from a midpoint of a tube cross section of said at least one measuring tube encircled by said at least a first securement element.

25. The measuring transducer as claimed in claim 23, wherein: said first securement element is so placed and oriented in the measuring transducer, that a principle axis of inertia corresponding to a largest mass moment of inertia of said first securement element is at least one of:
essentially parallel to the oscillation axis,
essentially parallel to a plane of oscillation swept by the bending oscillations of said at least one measuring tube,
essentially perpendicular to movements of said first securement element accompanying the bending oscillations of said at least one measuring tube, and
spaced by a distance amounting to, at most, 50% of the width (e) of said projection from a midpoint of a tube cross section of said at least one measuring tube encircled by said at least a first securement element.

26. The measuring transducer as claimed in claim 1, wherein:
said first securement element is embodied essentially mirror symmetrically with respect to a principle axis of inertia corresponding to a smallest mass moment of inertia of said at least a first securement element.

27. The measuring transducer as claimed in claim 1, wherein the first securement element shows, with reference to one of its imaginary gravitational axes, an axial areal moment of inertia (J) determined by an outer diameter (D) of the measuring tube, the height (H), the total width B as well as width (e) and height (h) of the projection that corresponds essentially to the relationship $$J = \frac{BH^3}{12} - \frac{\pi}{64}D^4 + \frac{eh^3}{12} + \left(\frac{H+h}{2}\right)^2 \cdot eh.$$

28. The measuring transducer as claimed in claim 1, wherein:
said first securement element shows, with respect to one of its gravitational axes, a greatest axial areal moment of inertia (J) being determined by an outer diameter (D) of said at least one measuring tube, the height (H), the total width (B), the width (e) and the height (h) of said projection and lying in a cross sectional plane of said at least one measuring tube.

29. The measuring transducer as claimed in claim 1, wherein:
said first securement element shows, with respect to one of its gravitational axes, a greatest axial areal moment of inertia (J), and said first securement element is so placed and oriented in the measuring transducer, that the gravitational axis, to which the greatest axial areal moment of inertia (J) is referenced, is at least one of:
essentially parallel to the oscillation axis,
essentially parallel to a plane of oscillation swept by the bending oscillations of said at least one measuring tube,
essentially perpendicular to movements of said first securement element accompanying the bending oscillations of said at least one measuring tube,
coincident with a diameter of said at least one measuring tube extending within a tube cross section of said at least one measuring tube encircled by said first securement element, and
spaced by a distance amounting to, at most, 50% of the width (e) of said projection from a midpoint of a tube cross section of said at least one measuring tube encircled by said at least a first securement element.

30. The measuring transducer as claimed in claim 1, comprising at least two measuring tubes vibrating at least at times opposite-equally during operation, wherein the measuring tubes are at least one of the following:
- mechanically coupled with one another by means of an inlet side distributor piece and an outlet side distributor piece,
- mechanically coupled with one another by means of at least one inlet side coupling element and at least one outlet side coupling element,
- constructed equally to one another,
- curved, and
- parallel relative to one another.

31. The measuring transducer as claimed in claim 30, comprising at least two measuring tubes vibrating at least at times during operation, wherein:
- said at least one oscillation sensor differentially registers vibrations of the at least two measuring tubes.

32. The measuring transducer as claimed in claim 31, further comprising:
- a second securement element essentially equally constructed or identical to said first securement element, said second securement element fixed to a second one said measuring tubes.

33. Method of measuring mass flow and/or a density and/or a viscosity and/or a pressure of a medium flowing in a process line, comprising: using a measuring transducer according to claim 1.

34. The measuring transducer as claimed in claim 1, further comprising: a second securement element essentially equally constructed or identical to said first securement element.

* * * * *